Patented Apr. 7, 1942

2,279,262

UNITED STATES PATENT OFFICE 2,279,262

WEIGHTED CEMENT

Donald B. Edwards, Houston, Tex., assignor to Continental Oil Company, Ponca City, Okla., a corporation of Delaware No Drawing. Application February 15, 1937, Serial No. 125,812

11 Claims. (Cl. 106—95)

My invention relates to weighted cements and more particularly to cements to be used for the cementing of oil or gas wells.

The practice of cementing in oil or gas wells is well known to the art. It is common practice to cement a string of casing whenever such a string is run in an oil or gas well. Placing the cement behind the casing not only tends to hold the casing in place after it has been put into the well but also tends to seal off whatever formations are behind the casing. The sealing off of these formations is a very important function of the cement. If there are any porous formations containing oil, gas or water, it is extremely important that they be so well sealed off that the fluid cannot flow from them into the well. Another important use of cement in oil or gas wells is for shutting off certain formations below casing or in open hole. Cement is also used for sealing the holes in casing after it has been perforated. These are not all the uses of cement in oil or gas wells, but in the uses mentioned, and in all others, it is of utmost importance that the cement slurry be uncontaminated when it reaches the point at which it is desired for it to set.

In certain territories, especially where there is heaving shale present, and in deep wells, the cement does not seem to set properly and re-cementing is required. This is not only costly but dangerous since cementing, especially in deep wells, and in wells where heaving shale or a high pressure is encountered, is frequently a dangerous operation during which the well may be lost.

One cause of the difficulty appears to be in part due to the small differences in density of the cement slurry and the mud fluid being used. An ordinary mud fluid made with clay or clayey material and water, such as is used in most oil or gas wells, has a density of 9.5 to 11.0 pounds per gallon. By adding finely divided, inert materials, such as silica, barytes, or iron oxide, the density of such a mud fluid can be increased to as much as 18 or 19 pounds per gallon. However, at the present time, the density of the mud fluids used in ordinary oil or gas wells is between 9.5 and 12 pounds per gallon. The ordinary cement slurry used in oil or gas wells has a density of 14 to 16 pounds per gallon. The usual difference in density between the mud fluid in the well and the cement slurry is therefore about 4 to 6 pounds per gallon. This difference in density is apparently sufficiently great to keep the two suspensions from intermixing except just at their interface and to make the cement displace the mud completely at whatever level it is desired to place the cement. The cement slurry is usually placed in the well by pumping it through tubing, drill pipe or casing. There appears to be very little contamination of the cement until after it leaves the bottom of the pipe through which it is being placed. If there is a difference of density of 4 to 6 pounds per gallon between the mud fluid and the cement slurry, the mud fluid apparently tends to float on the cement slurry as the slurry emerges from the pipe and starts upwards; the cement slurry more or less completely displaces the mud fluid and fills the entire space outside the pipe and a good cement job results since the cement slurry is but little contaminated with the mud fluid.

In deep wells, or where high pressures are encountered, or in drilling in or through heaving shale, heavier mud fluids are used, thus reducing the difference in density between the mud and the cement slurry. In wells of this type mud fluids with a density as high as 16.5 pounds per gallon have been used and a density of 18 to 20 pounds per gallon is not impossible. This greater density may be obtained by using powdered substances, such as barytes or hematite, or it may be obtained in other ways. The means by which the greater density of the mud fluid is obtained is of no importance to this invention, the important thing being the fact that the mud fluid does have a greater density than is ordinarily used.

When the density of the mud fluid in an oil or gas well is raised to 13 to 16 pounds per gallon or higher, as is the case in drilling deep wells, wells where high pressures are encountered or wells in or through heaving shale, the difference between the density of the cement slurry and the mud fluid is only one or two pounds per gallon, or at most three pounds, and in this case the cement will follow the line of least resistance when it emerges from the pipe and will channel through the mud, leaving a mixture of mud and cement instead of an uncontaminated cement plug.

Another reason for the failure of cement jobs in deep wells, in wells where high pressures are encountered, and in wells drilled in or through heaving shale, may be that the cement slurry is agitated or disturbed while it is setting. It is a well known fact that if a cement slurry is agitated or disturbed while it is taking its initial set, the strength will be decreased materially. In fact, if the cement is violently agitated while it is setting, it will not set as a uniform mass but will set as individual lumps or particles and the resultant set cement will have no more strength than so much crushed rock or gravel.

When an oil or gas well is cemented, the hydrostatic head of the combined mud fluid column and cement column may be sufficiently great to prevent the well from flowing or blowing out, but the hydrostatic pressure may not be great enough to prevent agitation of the cement slurry while it is setting. In such a case, the cement would not set properly and a poor cement job would result.

If a cement slurry were used of such a density that the combined hydrostatic pressure of the mud fluid column and the cement slurry column would prevent the agitation and disturbance of the cement slurry while it was setting, a good cement job would result.

One object of my invention is to provide a weighted cement whereby the difference between the density of the mud fluid and the density of the cement will be sufficiently great to enable the cement to completely fill the space where it is placed and to be uncontaminated by the mud fluid.

Another object of my invention is to provide a cement slurry of such a density that the combined hydrostatic pressure of the mud fluid column and the cement slurry column will allow the cement to be undisturbed and not agitated while it is setting.

Another object of my invention is to provide a better method of cementing oil or gas wells at great depth, or when encountering high pressures, or when drilling in or through heaving shale.

Other and further objects of my invention will appear from the following description:

In general, my invention contemplates increasing the density of the cement slurry by the addition of finely divided, powdered metals, by the addition of other finely divided, inert and insoluble materials of high density, and by the addition of soluble substances. These additions to the cement slurry may be made singly or a combination of the additive substances may be used.

Since ordinary Portland cement sets in a very short time at the temperatures found at the bottom of deep wells, there are now being used several cements to which have been added some retarding substance, such as a weak acid, which keeps the cement fluid for a longer period of time. Some of my work has been done using some of these slow-setting cements.

Finely divided metals may be used to increase the weight of the cement slurry. For example, using 40 mesh iron filings I have obtained these results:

| Weight | | | Density of slurry | 3-day compressive strength (cured at 180° F.) |
|---|---|---|---|---|
| Water | Cement | Iron filings | | |
| Percent | Percent | Percent | Lbs./gal. | Lbs./sq. inch |
| 40 | 60 | 0 | 14.2 | 2,590 |
| 28.6 | 71.4 | 0 | 16.3 | 3,490 |
| 24.6 | 62.3 | 13.1 | 18.2 | 11,300 |
| 22.0 | 41.2 | 36.8 | 19.7 | 3,960 |
| 22.5 | 40 | 37.5 | 20.2 | 3,840 |
| 19.4 | 32.2 | 48.4 | 22.2 | 3,100 |
| 16.0 | 26.6 | 57.4 | 23.8 | 3,160 |

I found that the fluidity of the slurry containing the iron was as good as that of the slurry with no iron, except for the one weighing 23.8 pounds per gallon. The iron settled out of this slurry so rapidly, it was difficult to measure its fluidity.

It is to be understood, of course, that any finely divided metal of high specific gravity may be employed, iron being given merely by way of example. Finely divided lead, copper, zinc, or other metals of high specific gravity may be employed and are within the scope of my invention.

Powdered compounds of metals and other finely divided, inert, insoluble material of high density may be used to increase the specific gravity of the slurry. For example, iron oxide, barytes, various lead oxides, and the like may be employed. Using powdered barytes, I have obtained these results:

| Weight | | | Fineness of barytes | Density of slurry | 3-day compressive strength (cured at 180° F.) |
|---|---|---|---|---|---|
| Water | Cement | Barytes | | | |
| Percent | Percent | Percent | | Lbs./gal. | Lbs./sq. inch |
| 40 | 60 | 0 | | 14.2 | 2,590 |
| 28.6 | 71.4 | 0 | | 16.3 | 3,490 |
| 25.9 | 55.6 | 18.5 | 95% thru 325 mesh | 17.5 | 4,230 |
| 26.0 | 37.0 | 37.0 | 95% thru 325 mesh | 18.0 | 2,340 |
| 20.6 | 51.4 | 28.0 | −60 mesh +100 mesh | 19.2 | 5,350 |
| 17.3 | 40.5 | 43.2 | −26 Mesh +60 mesh | 21.5 | 2,150 |

The addition of the barytes to the slurry seems to reduce the setting time of the slurry by about 25 to 30%, but at the test temperature of 180° F., none of the slurries set in less than 3 hours when a slow-setting cement was used. Three hours should allow ample time for placing the cement in the well wherever it is desired. Tests made with iron oxide, 95% of which would pass a 325 mesh sieve, showed about the same strength as barytes of the same fineness but the iron oxide slurries set more rapidly. Other finely divided, insoluble and inert materials, such as galena, lead concentrate, lead oxide, zinc oxide, zinc sulphide, copper sulphide, iron sulphides and, in general, any heavy substance which is susceptible of fine subdivision so that it may be suspended in the cement slurry to increase the density, may be used in this invention. Under some conditions, certain oxides of lead, as for example, red lead, are not wetted by water and, hence, although they have a high specific gravity, they form such a thick suspension with water that they would not increase the density much above that obtainable with cement and water. In this case, a wetting agent such as naphthenic acid, a sulfonated oil, a metallic soap, or the like may be employed in the cement slurry to enable the finely divided lead oxide to be suspended.

Soluble substances may also be used to increase the density of the cement slurry. These may be used in the form of saturated solutions; for example, using a saturated solution of sodium chloride and a 45 per cent by weight solution of sodium nitrate, I have obtained the following results:

| Liquid, kind | Wt. | Wt. cement | Density | 3-day compressive strength (cured at 180° F.) |
|---|---|---|---|---|
| | Per cent | Per cent | Lbs./gal. | |
| Water | 28.6 | 71.4 | 16.3 | 3,490 |
| Sat. sodium chloride | 30 | 70 | 17.5 | 3,050 |
| 45% sodium nitrate | 33 | 67 | 18.4 | 4,580 |

I have found that the cement remains fluid longer with these materials in the slurry, although they gel rapidly after agitation ceases. However, the gel strength of the cement is not sufficient to keep it from being pumped. Any other soluble substance which would not cause the cement to flash-set should be as good as those mentioned above, and I do not limit my invention to these materials mentioned.

No predetermined limits for density can be set forth now, as the density of the cement slurry for each well will have to be determined by the conditions in that particular well. In general, sufficient weighting material is used to increase the density of the cement slurry to a point at least five pounds per gallon higher than that of the particular mud fluid used. For example, if a heavy mud fluid of a density of 15 pounds per gallon were being employed, the cement slurry should have a density of at least 20 pounds and may be as high as 25 pounds per gallon.

Finely-divided, as used in this description to denote the materials used for weighting, is used to cover the range of sub-division between the largest particle size which could be pumped with the cement and the smallest particle size to which the materials could be ground commercially. The best results have been obtained with material finer than 20 mesh and coarser than 100 mesh.

The materials which are used to raise the density of the cement slurry may be incorporated with the dry cement when the cement is manufactured, or may be added with the cement as the cement is mixed.

In use, the weighted cement will displace the mud fluid and enable the mud fluid to float on top of the slurry and thus prevent the mud fluid from contaminating or channeling the cement slurry, enabling a homogeneous plug to be achieved. The weighted cement will also increase the hydrostatic head and will tend to allow the cement to set without being agitated after it has been pumped into place.

It will be understood that certain features and sub-combinations are of utility and may be employed without reference to other features and sub-combinations. This is contemplated by, and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A pumpable cement slurry for cementing oil wells having incorporated therein a finely divided, suspended metal.

2. A pumpable cement slurry for cementing oil wells including in combination cement, a finely divided metal and a wetting agent.

3. A pumpable cement slurry for cementing oil wells having incorporated therein a finely divided metal, said slurry having a density in excess of that of a usable slurry made with cement and water alone.

4. A pumpable cement slurry for cementing oil or gas wells having incorporated therein a finely divided, suspended heavy metallic compound.

5. A pumpable cement slurry for cementing oil wells including in combination cement, a finely divided heavy metallic compound and a wetting agent.

6. A pumpable cement slurry for cementing oil wells having incorporated therein a finely divided heavy metallic compound, said slurry having a density in excess of that of a usable slurry made with cement and water alone.

7. A pumpable cement slurry for cementing oil wells having incorporated therein a weighting agent, said slurry having a density in excess of that of a usable slurry made with cement and water alone.

8. A pumpable cement slurry for cementing oil wells having incorporated therein a weighting agent, said slurry having a density of from 18 to 30 pounds per gallon.

9. A pumpable cement slurry for cementing oil wells having incorporated therein a wetting agent and a material to increase the density.

10. A pumpable cement slurry for cementing oil or gas wells having incorporated therein soluble compounds in sufficient concentration to materially increase the density of the slurry.

11. A pumpable cement slurry for cementing oil or gas wells including in combination cement, a weighting agent, such as powdered iron or powdered barytes and a soluble compound such as sodium chloride, said slurry having a density in excess of that of a usable slurry made with cement and water alone.

DONALD B. EDWARDS.